(12) United States Patent
Ackermann et al.

(10) Patent No.: US 11,443,101 B2
(45) Date of Patent: Sep. 13, 2022

(54) FLEXIBLE PSEUDO-PARSING OF DENSE SEMI-STRUCTURED TEXT

(71) Applicant: INTERNATIONAL BUSINESS MACHINES CORPORATION, Armonk, NY (US)

(72) Inventors: Christopher F. Ackermann, Fairfax, VA (US); Charles E. Beller, Baltimore, MD (US); Michael Drzewucki, Woodbridge, VA (US)

(73) Assignee: International Business Machine Corporation, Armonk, NY (US)

( * ) Notice: Subject to any disclaimer, the term of this patent is extended or adjusted under 35 U.S.C. 154(b) by 0 days.

(21) Appl. No.: 17/087,994

(22) Filed: Nov. 3, 2020

(65) Prior Publication Data
US 2022/0138408 A1     May 5, 2022

(51) Int. Cl.
*G06F 40/169*     (2020.01)
*G06F 40/186*     (2020.01)
*G06F 16/84*     (2019.01)

(52) U.S. Cl.
CPC ............ *G06F 40/169* (2020.01); *G06F 16/84* (2019.01); *G06F 40/186* (2020.01)

(58) Field of Classification Search
CPC ....... G06F 40/169; G06F 40/186; G06F 16/84
USPC ........................................................ 715/230
See application file for complete search history.

(56) References Cited

U.S. PATENT DOCUMENTS

| | | | |
|---|---|---|---|
| 6,018,735 A * | 1/2000 | Hunter .............. | G06F 16/90344 |
| 7,389,306 B2 | 6/2008 | Schuetze | |
| 7,769,579 B2 | 8/2010 | Zhao | |
| 8,315,849 B1 * | 11/2012 | Gattani ................. | G06F 40/295 704/2 |
| 8,856,642 B1 * | 10/2014 | Riediger ................. | G06F 16/00 715/230 |
| 10,055,410 B1 * | 8/2018 | Dubbels .............. | G06F 16/9024 |
| 10,121,141 B1 * | 11/2018 | Belleville .......... | G06Q 20/3672 |
| 10,474,708 B2 * | 11/2019 | Roberts ............... | G06F 16/9038 |
| 10,482,174 B1 * | 11/2019 | Goodsitt .................. | G06N 3/08 |
| 10,489,387 B1 * | 11/2019 | Rogynskyy ........... | G06F 40/237 |
| 10,489,439 B2 | 11/2019 | Calapodescu | |
| 10,896,295 B1 * | 1/2021 | Shenoy ............... | G10L 15/1815 |

(Continued)

OTHER PUBLICATIONS

Evan Lenz; How XSLT Works; 2018; lenzconsulting.com; pp. 1-10.*

(Continued)

*Primary Examiner* — Andrew R Dyer
(74) *Attorney, Agent, or Firm* — Robert R. Aragona

(57) ABSTRACT

An embodiment for extracting information from semi-structured text is provided. The embodiment may include identifying one or more high confidence alignments of one or more entities and identifiers in a set of documents. The embodiment may also include analyzing one or more blocks of semi-structured text containing the one or more entities and identifiers. The embodiment may further include identifying one or more known alignments in each of the one or more blocks of semi-structured text. The embodiment may also include generating a structure template. The embodiment may further include applying the structure template to each of the one or more blocks of semi-structured text. The embodiment may also include annotating the set of documents with metadata reflecting the structure template and a location of each of the one or more blocks of semi-structured text.

14 Claims, 5 Drawing Sheets

(56) References Cited

U.S. PATENT DOCUMENTS

| | | | |
|---|---|---|---|
| 2006/0080311 A1* | 4/2006 | Potok | G06F 16/355 |
| 2006/0242180 A1 | 10/2006 | Graf | |
| 2007/0016614 A1* | 1/2007 | Novy | G06F 40/20 |
| 2007/0098303 A1* | 5/2007 | Gallagher | G06F 16/583 |
| | | | 382/305 |
| 2012/0089622 A1* | 4/2012 | Fan | G06F 16/334 |
| | | | 707/749 |
| 2012/0287089 A1* | 11/2012 | Shiota | G06K 9/222 |
| | | | 345/179 |
| 2013/0268446 A1* | 10/2013 | Buschmann | G06Q 30/01 |
| | | | 705/304 |
| 2015/0074507 A1* | 3/2015 | Riediger | G06F 16/313 |
| | | | 715/230 |
| 2015/0302243 A1* | 10/2015 | Gross | G09B 7/02 |
| | | | 382/224 |
| 2016/0012126 A1* | 1/2016 | Franceschini | G06F 16/951 |
| | | | 707/735 |
| 2016/0048499 A1* | 2/2016 | Deshmukh | G06F 40/40 |
| | | | 704/9 |
| 2016/0179934 A1* | 6/2016 | Stubley | G06N 5/00 |
| | | | 707/722 |
| 2016/0180437 A1* | 6/2016 | Boston | G06F 40/30 |
| | | | 705/26.7 |
| 2016/0180438 A1* | 6/2016 | Boston | G06Q 30/0282 |
| | | | 705/26.7 |
| 2017/0308524 A1* | 10/2017 | Bhatt | G06F 16/285 |
| 2017/0323157 A1* | 11/2017 | Guzman | G06F 16/5846 |
| 2017/0329867 A1* | 11/2017 | Lindsley | G06N 20/00 |
| 2017/0371847 A1* | 12/2017 | Acorda | G06F 40/18 |
| 2018/0034979 A1* | 2/2018 | Aggarwal | H04N 1/0044 |
| 2018/0137099 A1* | 5/2018 | Allen | G06F 40/253 |
| 2018/0157741 A1* | 6/2018 | Allen | G06N 5/022 |
| 2018/0203674 A1* | 7/2018 | Dayanandan | G06F 8/38 |
| 2018/0264347 A1* | 9/2018 | Tran | A63B 71/145 |
| 2019/0155804 A1* | 5/2019 | Miller | G06Q 10/00 |
| 2019/0155924 A1* | 5/2019 | Guggilla | G06F 16/84 |
| 2019/0236128 A1* | 8/2019 | Guzman | G06Q 40/12 |
| 2019/0377807 A1* | 12/2019 | Dean | G06F 16/211 |
| 2019/0392268 A1* | 12/2019 | Tariq | G06K 9/00791 |
| 2020/0065422 A1* | 2/2020 | Yan | G06F 40/20 |
| 2020/0073882 A1* | 3/2020 | Guggilla | G06F 16/353 |
| 2020/0265114 A1* | 8/2020 | Beller | G06F 16/93 |
| 2020/0293712 A1* | 9/2020 | Potts | G16H 10/60 |
| 2020/0327116 A1* | 10/2020 | Perlick | G06F 40/131 |
| 2021/0004431 A1* | 1/2021 | Li | G06F 16/972 |
| 2021/0064692 A1* | 3/2021 | Srinivasan | G06F 16/9566 |
| 2021/0109968 A1* | 4/2021 | Kim | G06F 16/951 |
| 2021/0263972 A1* | 8/2021 | Cooper | G06K 9/726 |

OTHER PUBLICATIONS

Bray et al.; Hypertext Links in XML; Mar. 5, 1997; textuality.com; pp. 1-20.*

Mell et al., "The NIST Definition of Cloud Computing", National Institute of Standards and Technology, Special Publication 800-145, Sep. 2011, 7 pages.

Soderland "Learning Information Extraction Rules for Semi-Structured and Free Text." Machine learning 34, (1999), Kluwer Academic Publishers, pp. 233-272.

* cited by examiner

FLEXIBLE PSEUDO-PARSING OF DENSE SEMI-STRUCTURED TEXT

GOVERNMENT LICENSE RIGHTS

This invention was made with government support under Government Contract No. 2018-18010800001 awarded by Watson@GovL. The government has certain rights to this invention.

BACKGROUND

The present invention relates generally to the field of computing, and more particularly to a system for identifying parsing templates for use in semi-structured text blocks.

Parsing relates to the field of analyzing text made of a sequence of tokens to determine the grammatical structure of the text with respect to formal grammar. Some reportings, such as phone books and social media profiles, list entities and their identifying information in close proximity to each other. Semi-structured text may encode relational information of the sort found in databases by using templated textual elements and punctuation marks such as periods, parentheses, and semicolons. For example, entities and their identifiers may be listed in a reporting as "Mary Smith (phone: 202-111-9999) John Doe (email: jdoe@email.com) Bob Johnson (twitter: @bjohnson)." Such structure templates often vary across different sources and different domains.

SUMMARY

According to one embodiment, a method, computer system, and computer program product for extracting information from semi-structured text is provided. The embodiment may include identifying one or more high confidence alignments of one or more entities and identifiers in a set of documents. The embodiment may also include analyzing one or more blocks of semi-structured text containing the one or more entities and identifiers. The embodiment may further include identifying one or more known alignments of the one or more entities and identifiers in each of the one or more blocks of semi-structured text based on the one or more high confidence alignments. The embodiment may also include generating a structure template based on the one or more known alignments of the one or more entities and identifiers. The embodiment may further include applying the structure template to each of the one or more blocks of semi-structured text. The embodiment may also include annotating the set of documents with metadata reflecting the structure template and a location of each of the one or more blocks of semi-structured text. The embodiment may further include populating a temporary query-specific knowledge base based on the one or more high confidence alignments. The embodiment may also include identifying the one or more blocks of semi-structured text where a plurality of entities and identifiers are mixed together.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
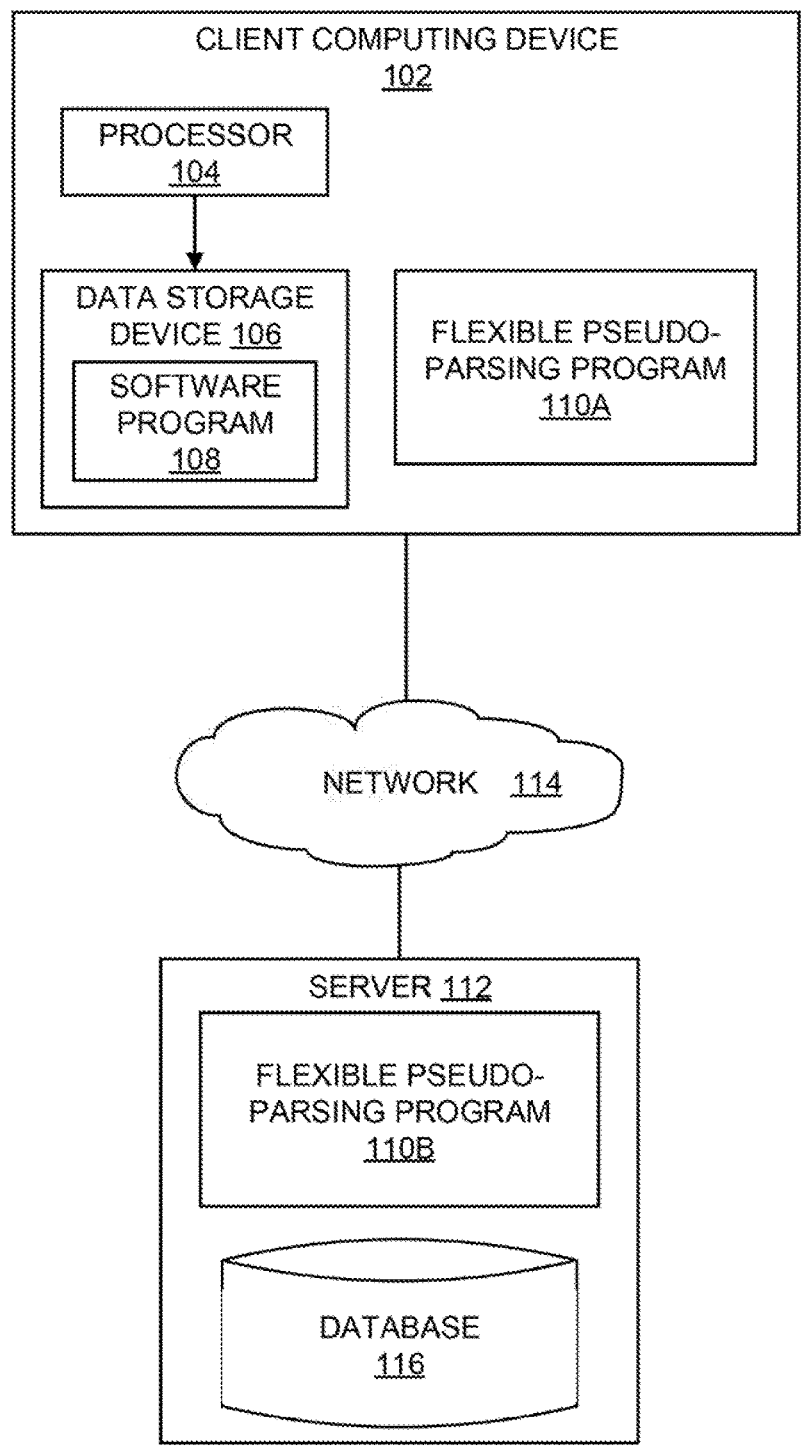
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to a system for identifying parsing templates for use in semi-structured text blocks. The following described exemplary embodiments provide a system, method, and program product to, among other things, utilize natural language processing (NLP) to identify blocks of text that contain a large number of entities and identifiers and, accordingly, annotate documents with metadata reflecting the location of semi-structured text blocks and their associated structure templates. Therefore, the present embodiment has the capacity to improve the technical field of parsing by rapidly extracting entities and identifiers in future search queries that return previously seen documents.

As previously described, parsing relates to the field of analyzing text made of a sequence of tokens to determine the grammatical structure of the text with respect to formal grammar. Some reportings, such as phone books and social media profiles, list entities and their identifying information in close proximity to each other. Semi-structured text may encode relational information of the sort found in databases by using templated textual elements and punctuation marks such as periods, parentheses, and semicolons. For example, entities and their identifiers may be listed in a reporting as "Mary Smith (phone: 202-111-9999) John Doe (email: jdoe@email.com) Bob Johnson (twitter: @bjohnson)." Such structure templates often vary across different sources and different domains. In such cases of dense entity mentions and identifiers, it may be difficult to determine which identifier is associated with each entity. Computers often struggle to identify the implicit structure in semi-structured text blocks and as a result, analyzing the relationship between different data is difficult. This problem is typically addressed by permanently storing the structure templates. However, maintaining a large structured database in addition to a search corpus may consume valuable resources and incur substantial overhead costs for little benefit. It may therefore be imperative to have a system in place to automatically select in real-time a set of workable parsing templates for use in a heterogenous set of semi-structured text blocks and consume minimal storage resources. Thus, embodiments of the present invention may provide advantages including, but not limited to, rapidly extracting entities and identifiers in future search queries, populating a temporary, query-specific knowledge base to preserve storage resources, and reliably parsing out each entity with its proper identifier.

According to at least one embodiment, the one or more high confidence alignments of one or more entities and identifiers in the set of documents may be identified. As used herein, "high confidence alignments" means an alignment where the identifier occurs within a maximum pre-defined threshold of the entity and where no other entities or identifiers occur within a maximum pre-configured proximity threshold of the identifier associated with the entity. The one or more blocks of semi-structured text containing the one or more entities and identifiers may be analyzed. The one or more known alignments of the one or more entities and identifiers in each of the one or more blocks of semi-structured text may be identified based on the one or more high confidence alignments. As used herein, "known alignments" means an entity/identifier alignment in the one or more blocks of semi-structured text that may be inferred from the high confidence alignments. The structure template may be generated based on the one or more known alignments of the one or more entities and identifiers. "Structure template" and "parsing template" are used interchangeably herein. The structure template may be applied to each of the one or more blocks of semi-structured text. The set of documents may be annotated with metadata reflecting the structure template and the location of each of the one or more blocks of semi-structured text. The temporary query-specific knowledge base may be populated based on the one or more high confidence alignments. The temporary query-specific knowledge base may be a database to store the one or more high confidence alignments. The temporary query-specific knowledge base may not permanently store the one or more high confidence alignments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to identify blocks of text that contain a large number of entities and identifiers and annotate documents with metadata reflecting the location of semi-structured text blocks and their associated structure templates.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a flexible pseudo-parsing program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running a flexible pseudo-parsing program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the flexible pseudo-parsing program 110A, 110B may be a program capable of rapidly extracting entities and identifiers in future search queries, populating a temporary, query-specific knowledge base to preserve storage resources, and reliably parsing out each entity with its proper identifier. The flexible pseudo-parsing method is explained in further detail below with respect to FIG. 2.

Figure 2:
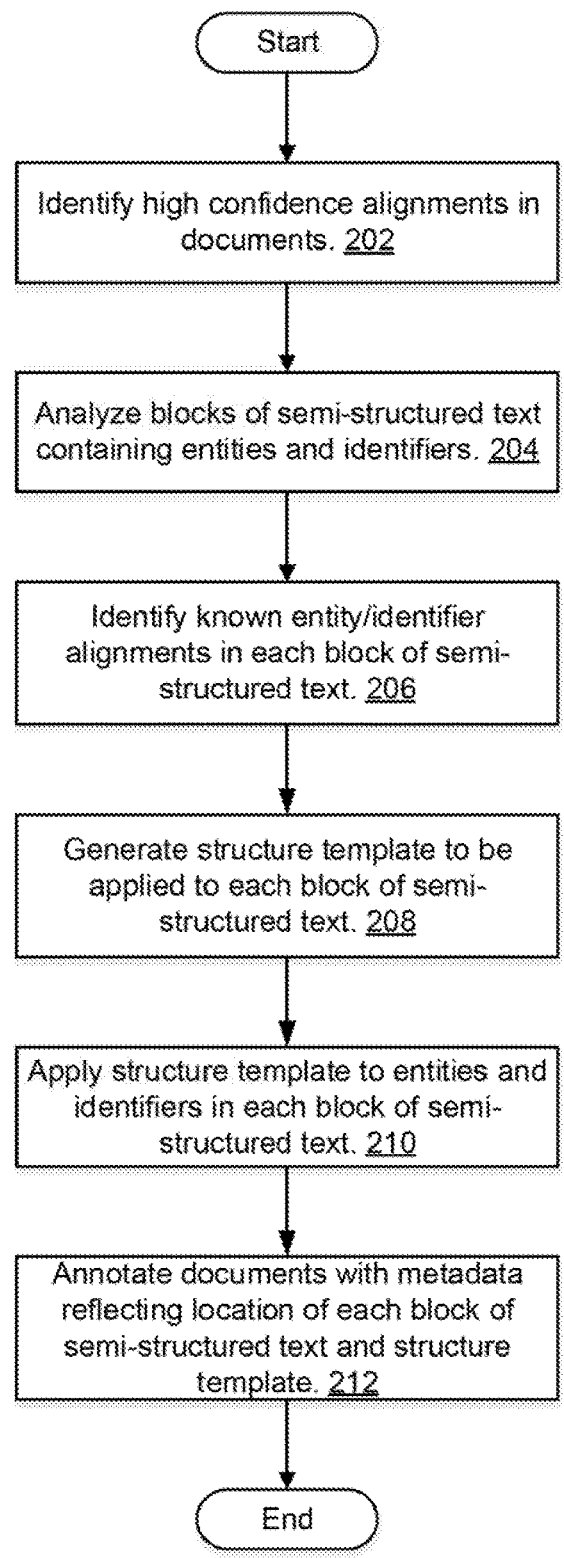
FIG. 2 illustrates an operational flowchart for extracting information from semi-structured text in a flexible pseudo-parsing process according to at least one embodiment.

Referring now to FIG. 2, an operational flowchart for extracting information from semi-structured text in a flexible pseudo-parsing process 200 is depicted according to at least one embodiment. At 202, the flexible pseudo-parsing program 110A, 110B identifies the one or more high confidence alignments of one or more entities and identifiers in the set of documents. An initial set of entity-identifier alignments may be extracted from a corpus of documents. The flexible pseudo-parsing program 110A, 110B may use an automated extraction method such as Statistical Information and Relation Extraction (SIRE) to extract the initial set of entity-identifier alignments. The initial set of entity-identifier alignments may be extracted based on the one or more high confidence alignments. For example, if the sentence "[t]he organization was supported by [John Doe] (email: [jdoe@email.com]) for the last quarter of the fiscal year" appears in a block of semi-structured text, the identifier "jdoe@email.com" may be associated with the entity "John Doe" with a high degree of confidence. As described above, a high confidence alignment may be an alignment where the identifier occurs within the maximum pre-defined threshold of the entity and where no other entities or identifiers occur within the maximum pre-configured proximity threshold of the identifier associated with the entity. For example, in at least one other embodiment, in each of the one or more blocks of semi-structured text, the pre-defined threshold of the entity and identifier may be at most 20 characters apart from each other and the maximum pre-configured proximity threshold may be a threshold where only one entity and one identifier occur. Continuing the example from above, the only entity in the sentence is "John Doe" and the only identifier is "jdoe@email.com." Therefore, [John Doe] (email: [jdoe@email.com]) may be identified as a high confidence alignment. In the present embodiment, the one or more high confidence alignments may be populated into the temporary query-specific knowledge base to guide the extraction of the one or more known alignments of the one or more entities and identifiers, described in further detail below.

Then, at 204, the flexible pseudo-parsing program 110A, 110B analyzes the one or more blocks of semi-structured text containing the one or more entities and identifiers. The flexible pseudo-parsing program 110A, 110B may use natural language processing (NLP) to identify the one or more blocks of semi-structured text containing a plurality of entities and identifiers that are mixed together. The plurality of entities and identifiers mixed together may be contained in a semi-structured block of text where at least 80% of the text is composed of entities and their associated identifiers. Other features of the one or more blocks of semi-structured text, such as a paucity of verbs, adjectives, and/or prepositions, may also be analyzed to identify whether the plurality of entities and identifiers are mixed together. The analyzation of the one or more blocks of semi-structured text may be highly accurate, especially when the semi-structured text is separated from free text by formatting annotations and/or whitespace.

Next, at 206, the flexible pseudo-parsing program 110A, 110B identifies the one or more known alignments of the one or more entities and identifiers in each of the one or more blocks of semi-structured text. The identification of the one or more known alignments may be based on the one or more high confidence alignments identified in step 202. The temporary query-specific knowledge base may be queried for the one or more high confidence alignments that were extracted in step 202. This querying of the temporary query-specific knowledge base enables the extraction of the one or more known alignments of the one or more entities and identifiers. As described above, a known alignment is an alignment where the entity and its associated identifier may be inferred from the one or more high confidence alignments. For example, the high confidence alignment "[John Doe] (email: [jdoe@email.com])" may be applied to a semi-structured block of text containing "Mary Smith (phone: 202-111-9999); John Doe (email: jdoe@email.com); Bob Johnson (twitter: @bjohnson) . . . ." Therefore, "John Doe (email: jdoe@email.com)" may be identified as a known alignment since this alignment has the same structure of the high confidence alignment, i.e., a name being the entity and an email address being the identifier. The one or more known alignments of the one or more entities and identifiers may be extracted from the corpus of documents by using SIRE as described above and added to the temporary query-specific knowledge base.

Then, at 208, the flexible pseudo-parsing program 110A, 110B generates the structure template. The structure template may be based on the one or more known alignments of the one or more entities and identifiers. Given the alignment "John Doe (email: jdoe@email.com)" described above, the structure template for the one or more blocks of semi-structured text may be derived as "<entity> (email: <identifier>)." In any given block of semi-structured text, the most crucial information to infer the structure template to be generated may be a separator and a relative order of the name and the identifier. For example, in the alignment "John Doe (email: jdoe@email.com)," the separator may be a colon and the relative order may be identified as <name, identifier>.

Next, at 210, the flexible pseudo-parsing program 110A, 100B applies the structure template to each of the one or more blocks of semi-structured text. The structure template generated in step 208 may be applied to the one or more blocks of semi-structured text to extract all other entities and identifiers. The all other entities and identifiers may be extracted from the corpus of documents by using SIRE as described above. For example, the semi-structured block of text containing "Mary Smith (phone: 202-111-9999); John Doe (email: jdoe@email.com); Bob Johnson (twitter: @bjohnson) . . . ." would produce the following alignments: "202-111-9999→Mary Smith" and "@bjohnson-<Bob Johnson . . . ." According to at least one other embodiment, where each block of semi-structured text has a different structure, the produced alignments in step 210 may be added to the temporary knowledge base to infer the structure template of the different blocks of semi-structured text. For example, a block of semi-structured text may not contain the name and identifier of a person, but rather the name and identifier of a country, e.g., England. England has a country telephone code of +44. Therefore, the structure template may be derived as "<entity> (telephone code: <identifier>)."

In the present embodiment, at 212, the flexible pseudo-parsing program 110A, 110B annotates the set of documents with metadata reflecting the structure template and the location of each of the one or more blocks of semi-structured text. The metadata may further indicate the boundaries of the one or more blocks of semi-structured text. The metadata may be a simple markup of identifying text placed adjacent to each block of the one or more blocks of semi-structures text that contains at least one entity-identifier alignment. For example, the structure template "<entity> (email: <identifier>)" may be placed adjacent to each block of semi-structured text that contains a person's name and an identifier associated with that person's name. The metadata annotation in the set of documents may be stored in a permanent query-specific knowledge base to provide for more rapid extraction of entities and identifiers in future queries returning previously retrieved documents.

It may be appreciated that FIG. 2 provides only an illustration of one implementation and does not imply any limitations with regard to how different embodiments may be implemented. Many modifications to the depicted environments may be made based on design and implementation requirements.

Figure 3:
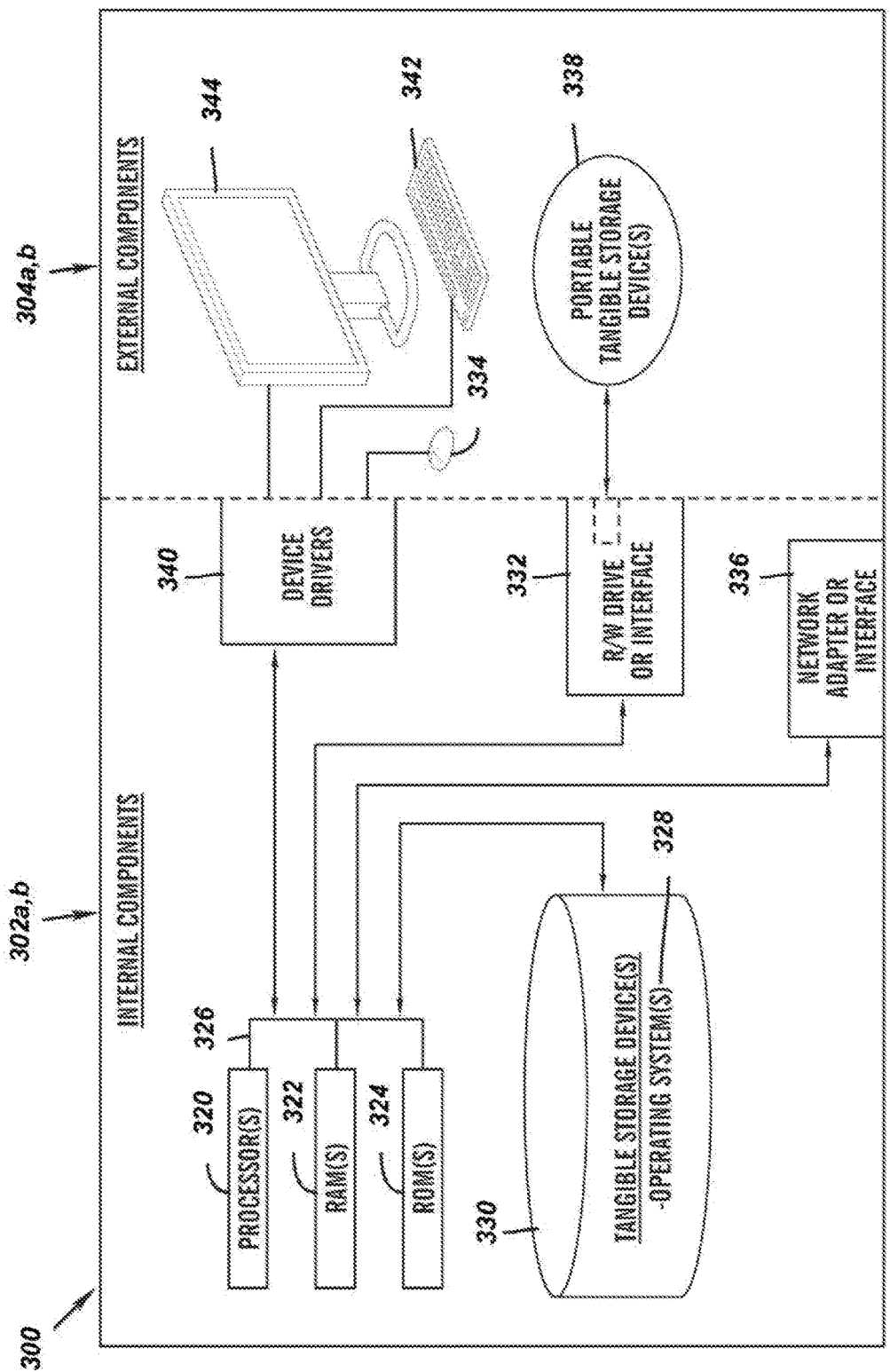
FIG. 3 is a functional block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 *a,b* and external components 304 *a,b* illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the flexible pseudo-parsing program 110A in the client computing device 102 and the flexible pseudo-parsing program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the flexible pseudo-parsing program 110A, 110B, can be stored on one or more of the respective portable computer-readable tangible storage devices 338, read via the respective R/W drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The software program 108 and the flexible pseudo-parsing program 110A in the client computing device 102 and the flexible pseudo-parsing program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the flexible pseudo-parsing program 110A in the client computing device 102 and the flexible pseudo-parsing program 110B in the server 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
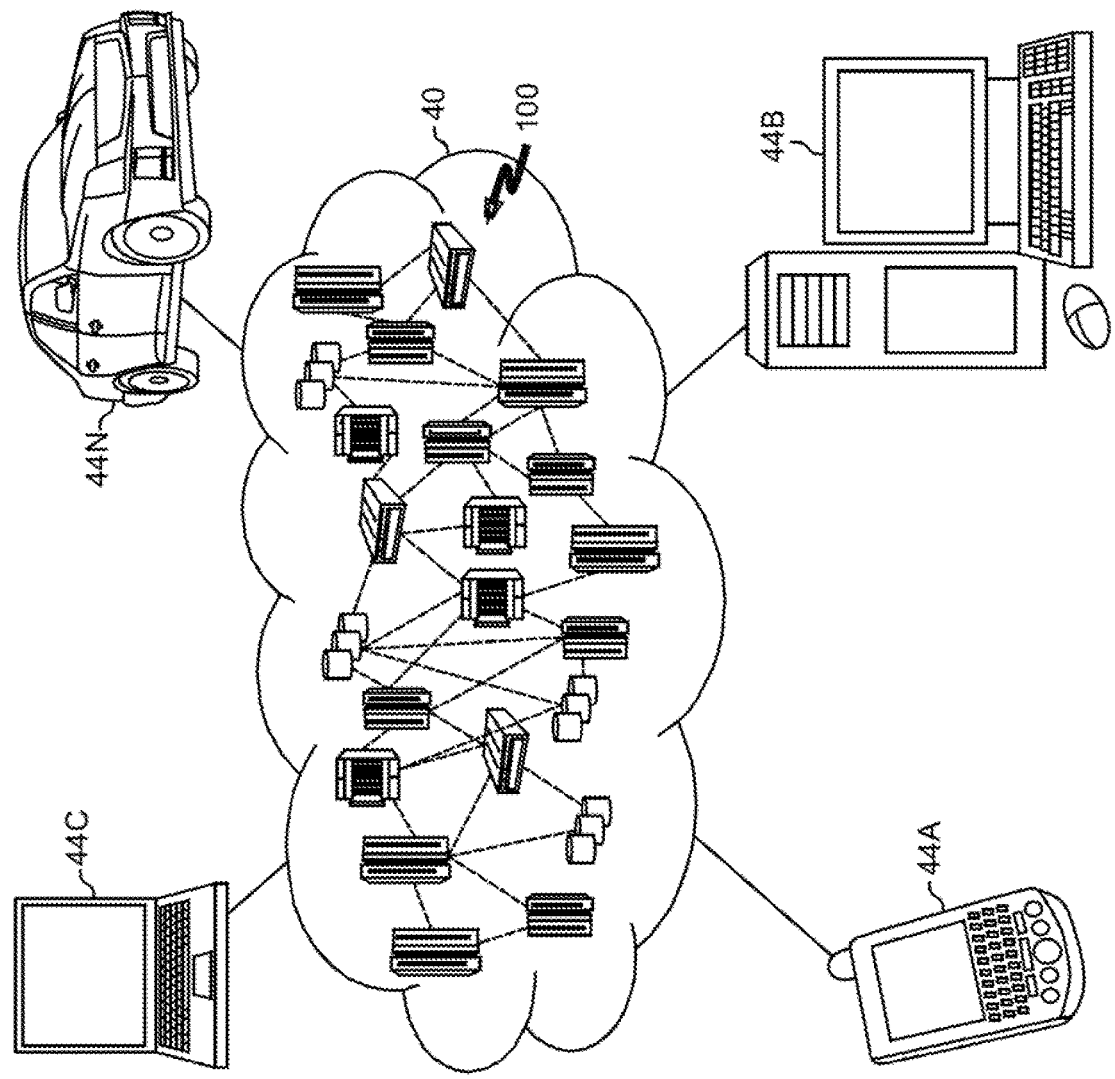
FIG. 4 depicts a cloud computing environment according to an embodiment of the present invention.

Referring now to FIG. 4, illustrative cloud computing environment 40 is depicted. As shown, cloud computing environment 40 comprises one or more cloud computing nodes 100 with which local computing devices used by cloud consumers, such as, for example, personal digital assistant (PDA) or cellular telephone 44A, desktop computer 44B, laptop computer 44C, and/or automobile computer system 44N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 40 to offer infrastructure, platforms and/or software as services for which a cloud consumer does not need to maintain resources on a local computing device. It is understood that the types of computing devices 44A-N shown in FIG. 4 are intended to be illustrative only and that computing nodes 100 and cloud computing environment 40 can communicate with any type of computerized device over any type of network and/or network addressable connection (e.g., using a web browser).

Figure 5:
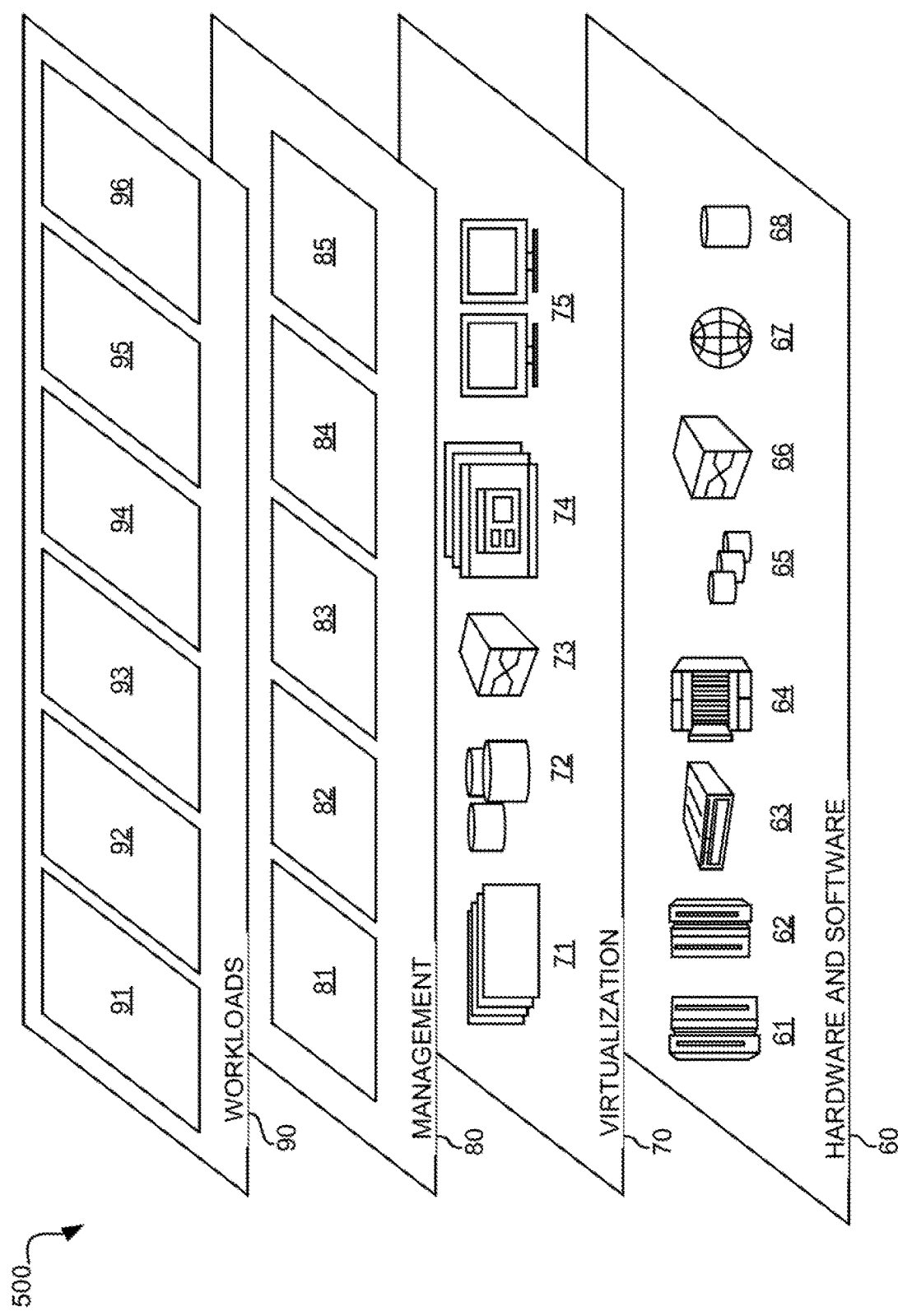
FIG. 5 depicts abstraction model layers according to an embodiment of the present invention.

Referring now to FIG. 5, a set of functional abstraction layers 500 provided by cloud computing environment 40 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and flexible pseudo-parsing through natural language description 96. Flexible pseudo-parsing through natural language description 96 may relate to identifying blocks of text that contain a large number of entities and identifiers in order to annotate documents with metadata reflecting the location of semi-structured text blocks and their associated structure templates.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of extracting information from semi-structured text, the method comprising:

identifying one or more high confidence alignments of one or more entities and one or more identifiers in a set of documents, wherein the one or more high confidence alignments are a string of text within a maximum pre-configured proximity threshold, wherein the maximum pre-configured proximity threshold of the one or more high confidence alignments is a threshold where only one entity and one identifier occur in each of the one or more blocks of semi-structured text, and the one entity and the one identifier are within twenty characters of each other;

analyzing one or more blocks of semi-structured text containing the one or more entities and the one or more identifiers;

identifying one or more known alignments in each of the one or more blocks of semi-structured text containing the one or more entities and the one or more identifiers based on the one or more high confidence alignments, wherein the one or more known alignments are a string of text;

generating a structure template based on the one or more known alignments;

applying the structure template to each of the one or more blocks of semi-structured text containing the one or more entities and the one or more identifiers; and annotating the set of documents with metadata, wherein the metadata annotation in the set of documents includes the structure template placed adjacent to each of the one or more blocks of semi-structured text containing the one or more entities and the one or more identifiers, wherein the metadata annotation in the set of documents includes a location of each of the one or more blocks of semi-structured text containing the one or more entities and the one or more identifiers, and wherein the metadata annotation in the set of documents is stored in a permanent query-specific knowledge base.

2. The method of claim 1, wherein analyzing the one or more blocks of semi-structured text containing the one or more entities and the one or more identifiers further comprises:

identifying the one or more blocks of semi-structured text where a plurality of entities and a plurality of identifiers are mixed together.

3. The method of claim 2, wherein the plurality of entities and the plurality of identifiers mixed together are contained in a semi-structured block of text where at least 80% of the text is composed of entities and identifiers associated with the entities.

4. The method of claim 3, further comprising:

populating a temporary query-specific knowledge base based on the one or more high confidence alignments.

5. The method of claim 4, wherein the temporary query-specific knowledge base is added to a permanent structured knowledge base.

6. A computer system, the computer system comprising: one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

identifying one or more high confidence alignments of one or more entities and one or more identifiers in a set of documents, wherein the one or more high confidence alignments are a string of text within a maximum pre-configured proximity threshold, wherein the maximum pre-configured proximity threshold of the one or more high confidence alignments is a threshold where only one entity and one identifier occur in each of the one or more blocks of semi-structured text, and the one entity and the one identifier are within twenty characters of each other;

analyzing one or more blocks of semi-structured text containing the one or more entities and the one or more identifiers;

identifying one or more known alignments in each of the one or more blocks of semi-structured text containing the one or more entities and the one or more identifiers based on the one or more high confidence alignments, wherein the one or more known alignments area string of text;

generating a structure template based on the one or more known alignments;

applying the structure template to each of the one or more blocks of semi-structured text containing the one or more entities and the one or more identifiers; and annotating the set of documents with metadata, wherein the metadata annotation in the set of documents includes the structure template placed adjacent to each of the one or more blocks of semi-structured text containing the one or more entities and the one or more identifiers, wherein the metadata annotation in the set of documents includes a location of each of the one or more blocks of semi-structured text containing the one or more entities and the one or more identifiers, and wherein the metadata annotation in the set of documents is stored in a permanent query-specific knowledge base.

7. The computer system of claim 6, wherein analyzing the one or more blocks of semi-structured text containing the one or more entities and the one or more identifiers further comprises:

identifying the one or more blocks of semi-structured text where a plurality of entities and a plurality of identifiers are mixed together.

8. The computer system of claim 7, wherein the plurality of entities and the plurality of identifiers mixed together are contained in a semi-structured block of text where at least 80% of the text is composed of entities and identifiers associated with the entities.

9. The computer system of claim 8, further comprising:

populating a temporary query-specific knowledge base based on the one or more high confidence alignments.

10. The computer system of claim 9, wherein the temporary query-specific knowledge base is added to a permanent structured knowledge base.

11. A computer program product, the computer program product comprising:

one or more computer-readable tangible storage medium and program instructions stored on at least one of the one or more tangible storage medium, the program instructions executable by a processor capable of performing a method, the method comprising:

identifying one or more high confidence alignments of one or more entities and one or more identifiers in a set of documents, wherein the one or more high confidence alignments are a string of text within a maximum pre-configured proximity threshold, wherein the maximum pre-configured proximity threshold of the one or more high confidence alignments is a threshold where only one entity and one identifier occur in each of the one or more blocks of semi-structured text, and the one entity and the one identifier are within twenty characters of each other;

analyzing one or more blocks of semi-structured text containing the one or more entities and the one or more identifiers;

identifying one or more known alignments in each of the one or more blocks of semi-structured text containing the one or more entities and the one or more identifiers based on the one or more high confidence alignments, wherein the one or more known alignments are a string of text;

generating a structure template based on the one or more known alignments;

applying the structure template to each of the one or more blocks of semi-structured text containing the one or more entities and the one or more identifiers; and annotating the set of documents with metadata, wherein the metadata annotation in the set of documents includes the structure template placed adjacent to each of the one or more blocks of semi-structured text containing the one or more entities and the one or more identifiers, wherein the metadata annotation in the set of documents includes a location of each of the one or more blocks of semi-structured text containing the one or more entities and the one or more identifiers, and wherein the metadata annotation in the set of documents is stored in a permanent query-specific knowledge base.

12. The computer program product of claim 11, wherein analyzing the one or more blocks of semi-structured text containing the one or more entities and the one or more identifiers further comprises:

identifying the one or more blocks of semi-structured text where a plurality of entities and a plurality of identifiers are mixed together.

13. The computer program product of claim 12, wherein the plurality of entities and the plurality of identifiers mixed together are contained in a semi-structured block of text where at least 80% of the text is composed of entities and identifiers associated with the entities.

14. The computer program product of claim 13, further comprising:

populating a temporary query-specific knowledge base based on the one or more high confidence alignments.

* * * * *